C. W. THOMAS.
FURNACE.
APPLICATION FILED APR. 4, 1908. RENEWED SEPT. 3, 1910.
989,443.
Patented Apr. 11, 1911.
3 SHEETS—SHEET 1.
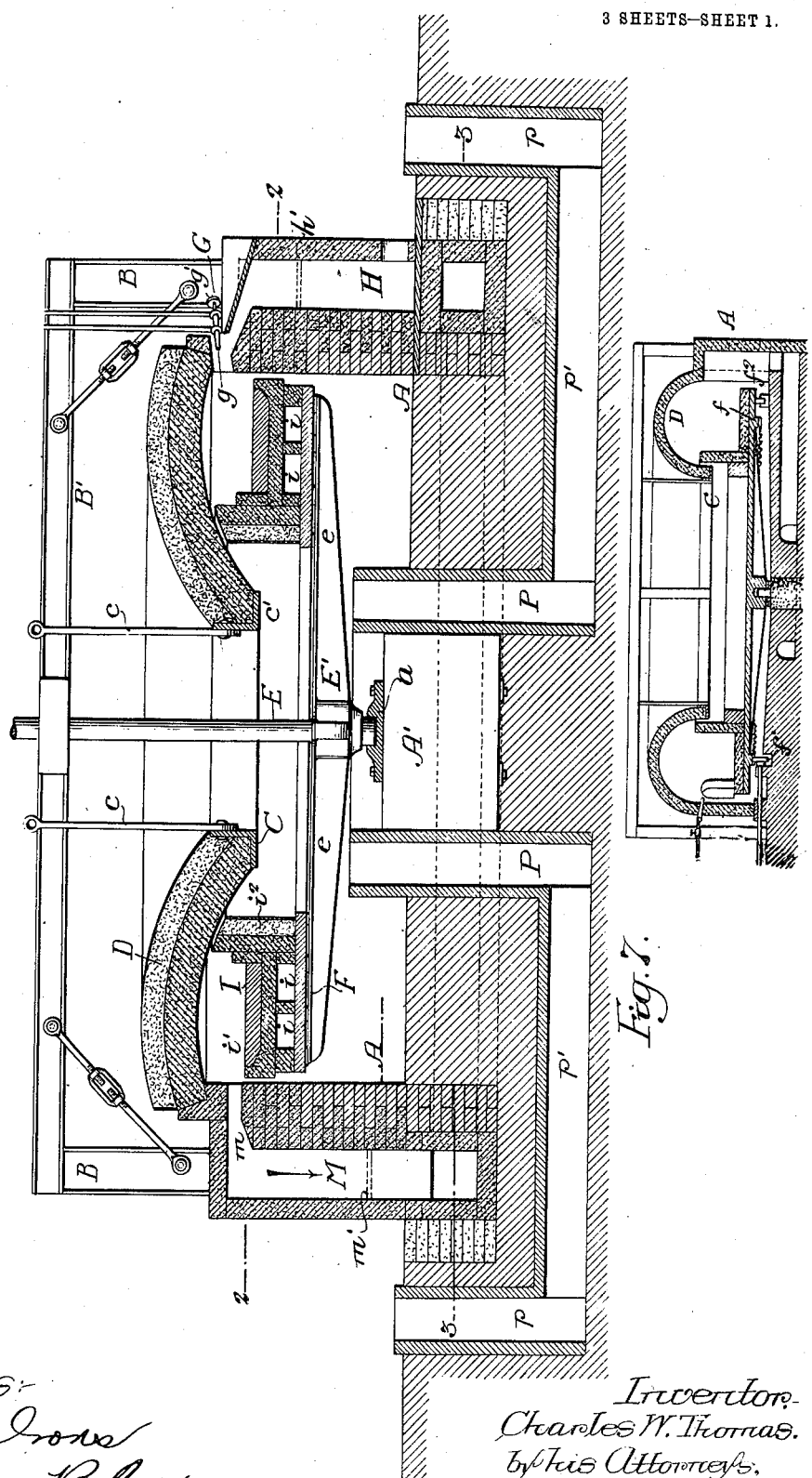
Witnesses:
Inventor:
Charles W. Thomas.
by his Attorneys,
Howson & Howson

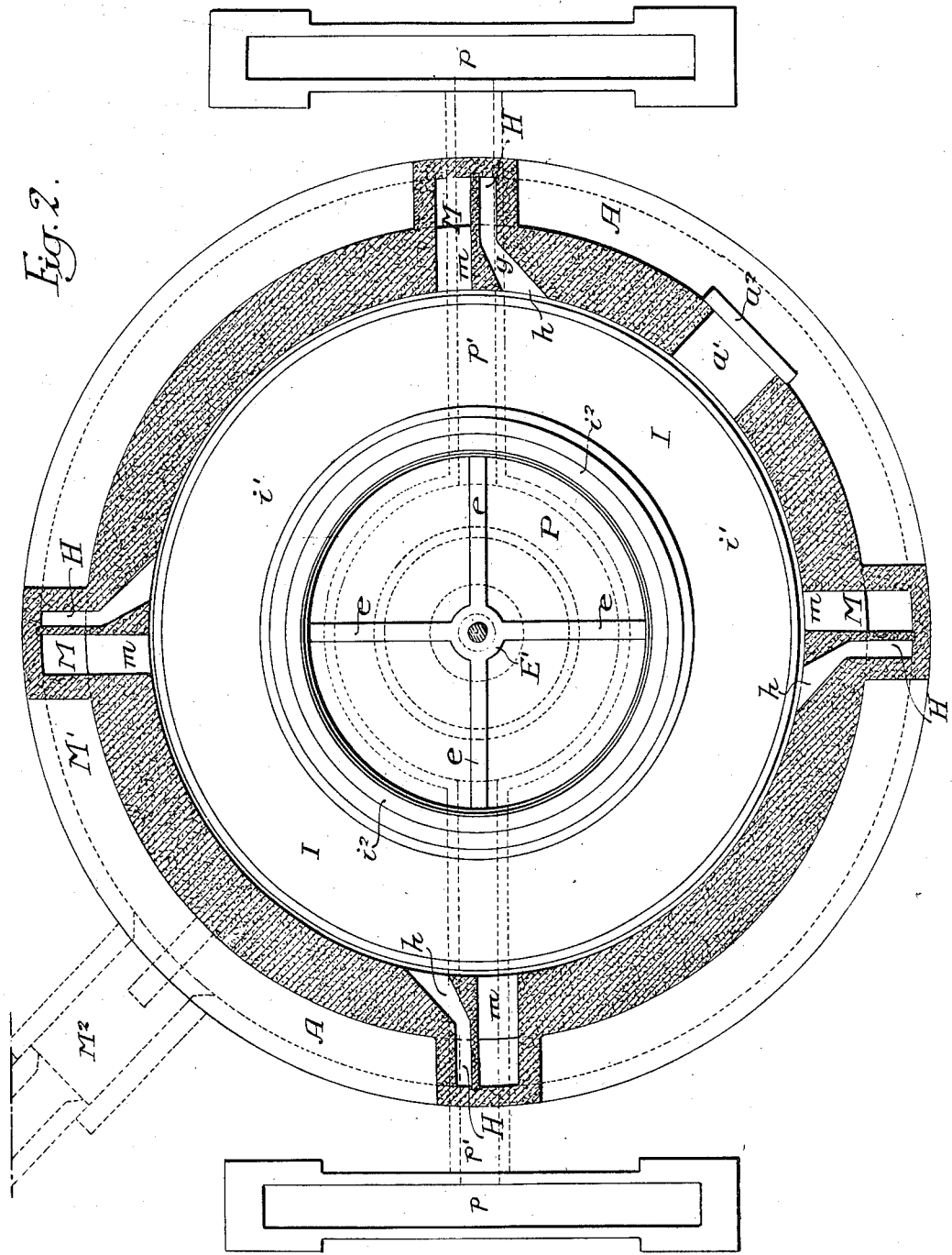

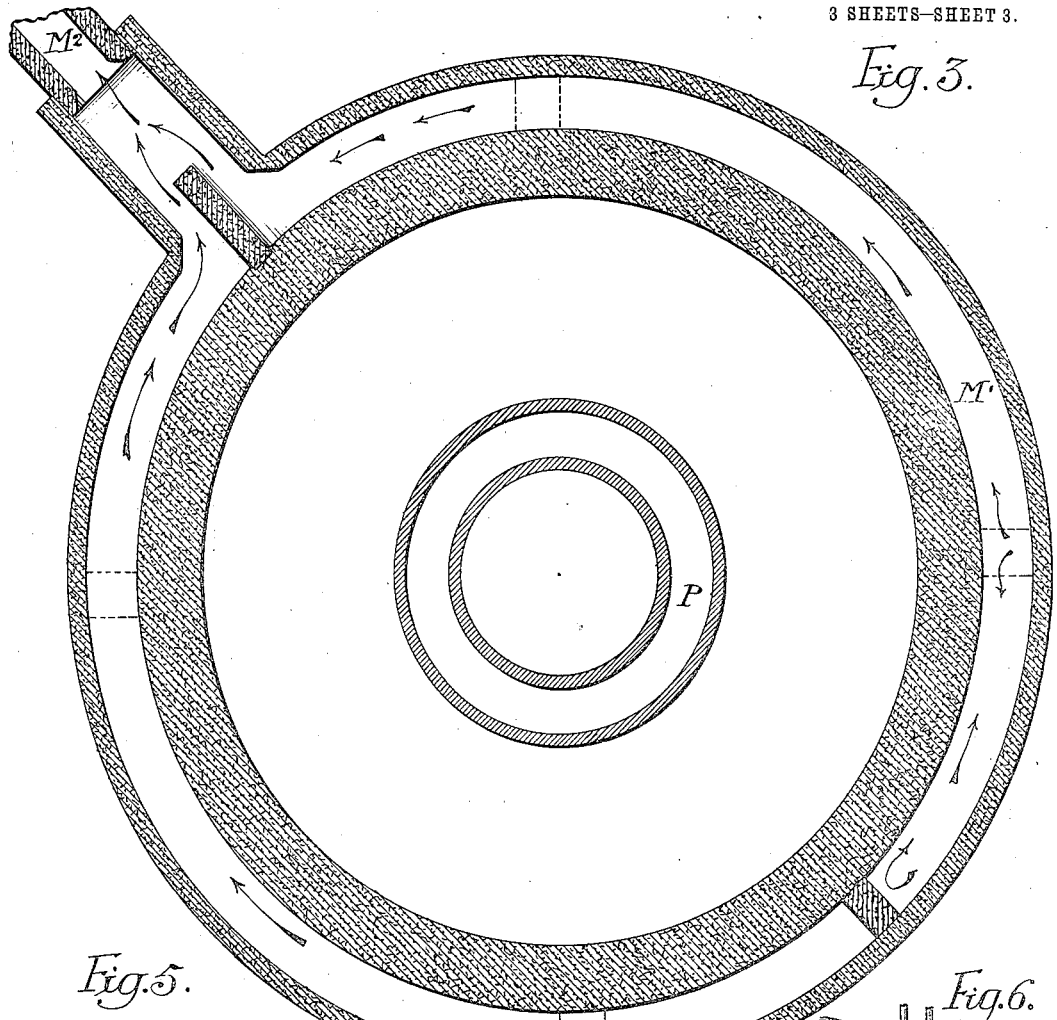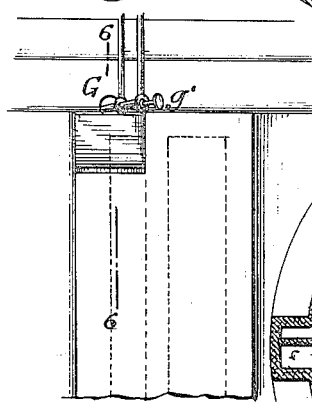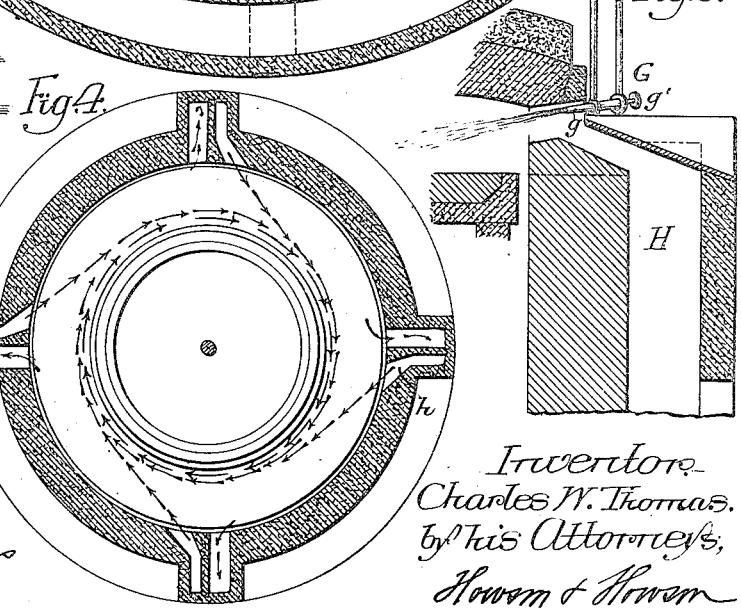

UNITED STATES PATENT OFFICE.

CHARLES W. THOMAS, OF LINDENWOLD, NEW JERSEY.

FURNACE.

989,443.      Specification of Letters Patent.      Patented Apr. 11, 1911.

Application filed April 4, 1908, Serial No. 425,111.    Renewed September 3, 1910. Serial No. 580,297.

*To all whom it may concern:*

Be it known that I, CHARLES W. THOMAS, a citizen of the United States, residing in Lindenwold, Camden county, New Jersey, have invented certain Improvements in Furnaces, of which the following is a specification.

One object of my invention is to construct a furnace in which high temperature may be maintained; and a further object is to so design the furnace that a rotating hearth can be used, and in which the heat is evenly distributed and the products of combustion consumed.

My improved furnace can be used for heating, baking, roasting, burning or firing a large number of different materials for sundry purposes, (this versatility is largely due to the fact that this furnace will withstand the highest practical temperatures as well as the lower, and is easily and quickly controlled), and is especially adapted for use in the manufacture of tiles, slabs and other objects of artificial stone, especially of a vitreous nature, where the material is introduced into the furnace in either a dry or a moist state and subjected, while in the furnace, to an intense heat for a certain length of time to produce a given result.

My invention has been used successfully for firing silicious compounds to a more or less vitreous condition, used for food and grit for poultry. Successful experiments have been made in this furnace for continuous lime burning, and it can be used for burning cement and cement compounds, roasting various ores, pot glass making, and for general laboratory use.

In the accompanying drawings:—Figure 1, is a vertical sectional view of my improved furnace; Fig. 2, is a sectional plan view on the line 2—2, Fig. 1; Fig. 3, is a sectional plan view on the line 3—3, Fig. 1; Fig. 4, is a diagram plan view illustrating the gas flame and other combustion currents; Fig. 5, is a side view showing one of the burners; Fig. 6, is a vertical sectional view on the line 6—6, Fig. 5; and Fig. 7, is a vertical sectional view of a modification.

A is the outer annular wall.

B is a frame consisting of metal shapes in the present instance, and hung from the cross member B' of this frame by means of rods $c$ is a metallic ring C having a flange $c'$.

D is the annular roof having its outer edge supported on the wall A and its inner edge carried by the ring C. Mounted on a suitable foundation A' is a step bearing $a$ for a vertical shaft E, on which is mounted a hub E' having arms $e$ carrying an annular platform F extending under the arched roof D. The hearth I is built upon this platform F and consists of blocks $i$, slabs $i'$ and a wall $i^2$ of fire brick. The wall $i^2$ is comparatively close to the ring C and extends to a point near the roof D, leaving a clear space directly under the roof as shown.

While I prefer to build the hearth in the manner illustrated in Fig. 1, the form of the hearth may be modified to meet certain conditions. The present design is intended to receive flat slabs of granular material which must be heated to a certain degree before being pressed into final shape.

The fuel used in the present instance is oil, and is introduced through a series of burners G, each having a nozzle $g$ and a valve $g'$. The nozzle of the burner extends into the mouth $h$ of the air intake flue H and this mouth is formed at an angle so that the flame will be projected tangent to the inner wall $i^2$ of the hearth. In the present instance the outlet flue M is situated alongside of the flue H and the opening $m$ from the furnace to the flues is directly back of the burner opening.

I have shown in the present instance four burners and four flues, but it will be understood that any number of burners and any number of flues may be used, depending upon the type and size of the furnace, without departing from the essential features of the invention, and the outlet flues may be situated midway between the burners or at any point to produce a given result.

The hearth, in the present instance, is rotated by applying power to the vertical shaft E, and the shaft is driven at such a speed that the hearth will rotate slowly so that one revolution in many cases will be sufficient to heat material carried by the hearth to the proper degree. In some instances, however, the hearth may be mounted simply on a step bearing as shown in Fig. 7, and on the underside of the hearth there may be a rack $f$ with which engages a driven pinion $f'$ which will impart motion to the hearth; the hearth being supported near its periphery by a series of rollers $f^2$.

The outlet flues M communicate with the annular flue M', Fig. 3, which in turn communicates with the stack flue M², and the flues M are provided with dampers m' to regulate the passage of the products of combustion from the furnace, while the intake flue H is supplied with a damper h' to regulate the inflow of air to the furnace, so that the amount of air and oil can be regulated to give the proper degree of heat to regulate the combustion and to control the draft of air into the furnace at the other openings.

In order to supply air to the center of the furnace beyond the annular walls $i^2$ of the hearth, I provide an annular air inlet passage P communicating with intake openings $p$ by means of one or more flues $p'$ so that there is a current of air passing through the center of the furnace and through the space formed by the annular ring C.

I have found by a series of experiments that the flame, when the furnace is in action, travels in a circular path over the hearth and that there are practically two currents—one traveling close to the inner wall $i^2$ of the hearth, as indicated in diagram, Fig. 4, and the other traveling in the same direction and beyond the first current.

The heavy products of combustion containing unconsumed carbon are driven against the wall of the hearth by the blast of the incoming fuel and air from the burners, consequently they rotate in the furnace until the carbon is consumed, and then the incombustible gases escape through the flues.

There is a certain amount of air drawn through the space between the vertical walls $i^2$ of the hearth and the roof D, and this air mixes with the products of combustion in the furnace and aids in the proper combustion of the mixture. The waste products eventually pass out of the flue openings $m$ into the flues M to the stack, but the gases escaping are comparatively light, showing that the carbon is practically consumed.

$a'$ is an opening on a line with the hearth through which material may be placed upon or removed from the hearth, this opening is provided with a suitable door or cover $a^2$, Fig. 2.

I find in operating a furnace under the plan described that the ring supporting the inner portion of the roof will be protected by the in-flow of air through the space between the roof and the inner wall of the hearth, and the amount of air flowing through this space can be regulated by operating the dampers in the burner in-take flues, as well as the dampers in the exhaust flues.

The general impression would be that the flame would escape from the combustion chamber through this space between the wall and the roof and destroy the metal ring supporting the roof, but this is not the case. The draft of the furnace is sufficient to at all times draw into the furnace a given amount of air, keeping the ring comparatively cool.

My improved furnace is especially adapted as a high temperature furnace, as the construction involves means to bring the temperature of the furnace to a high degree and by having the furnace arranged so that the combustion chamber is practically within the furnace and directly above the hearth and by providing a number of burners discharging the fuel into the furnace, I can obtain a very steady heat at a very high temperature.

I have illustrated my invention as utilizing oil as a fuel, but it will be understood that pulverized coal or other fuel may be used without departing from the essential features of the invention.

My experiments have shown that in this improved furnace I can obtain an even heat throughout the entire furnace, or I can cut out certain burners and regulate the intake and outtake flues so that the heat of the furnace will be more constant at one part than at another.

I claim:—

1. The combination in a furnace, of an annular wall, an overhanging roof open at the center, with a rotating hearth mounted under the roof within the wall, the inner portion of the hearth extending to a point near the roof but not touching the same so as to leave an annular passage for the ingress of air from the central opening in the roof into the combustion chamber, and means for supplying fuel to the combustion chamber.

2. The combination in a furnace, of an annular wall, an overhanging roof supported at its outer edge by the wall, and a ring supporting the inner edge of the roof, with a rotating hearth mounted under the roof and terminating some distance back of the ring and leaving a clear space for the ingress of air, thus preventing the burning away of the supporting ring.

3. The combination in a furnace, of an annular wall, an overhanging roof supported at its outer edge by the wall, means for supporting the inner portion of the roof, a rotating hearth mounted in the space inclosed by the wall, a series of burners projecting into the combustion chamber formed by the hearth, wall and roof, said burners being arranged so as to project the flame at a tangent to the hearth so as to cause the fuel and gases to travel in a circular path within the furnace, and air inlets and outlets for the products of combustion.

4. The combination in a furnace, of an annular wall, an overhanging roof, the outer edge of the roof being supported by the wall, a ring supporting the inner edge of the roof, a rotating hearth, a pivot therefor, and means for rotating the hearth, said hearth having an annular wall extending to a point near the roof, and means for supplying fuel to the furnace.

5. The combination in a furnace, of an annular wall, an overhanging roof supported at one edge by the wall, means for supporting the other edge of the roof, a hearth mounted under the roof, means for rotating the hearth, a series of outlet flues within the wall for the waste products of combustion, and a series of air inlet passages in the wall, said inlet passages and outlet flues being arranged in pairs, the air inlet passages communicating with the upper portion of the combustion chamber and the outlet flues communicating with the lower portion of the combustion chamber, and burners at said inlet passages.

6. The combination in a furnace, of an annular wall, an overhanging roof supported at its outer edge by said wall, a suspended ring supporting the inner edge of the roof, a hearth mounted under the roof and having a wall extending to a point near the roof, a series of burners projecting from the said wall, and air inlets and outlets for the products of combustion also in the wall.

7. The combination in a furnace, of an annular wall and an overhanging roof supported at its periphery by the wall, and a suspended ring supporting the inner edge of the roof, a rotating hearth mounted under the roof and having a vertical wall extending to a point close to the roof, so as to form an annular air intake passage, with means for supplying fuel and air to the combustion chamber, and means for regulating the amount of fuel and air admitted to the combustion chamber, whereby the admission of air to the combustion chamber through the space between the vertical wall of the hearth and the roof will be regulated.

8. The combination in a furnace having an annular wall, an overhanging roof arched in cross section, the outer edge of the roof being supported by the wall, a ring supporting the inner edge of the roof, a central step bearing, a shaft mounted in said bearing, arms extending from said shaft, a hearth supported by said arms, said hearth being under the overhanging roof and having an annular wall, the said wall extending to a point near the roof and forming an annular combustion chamber, a series of burners arranged at an angle so as to direct the flame tangent in respect to the inner wall of the combustion chamber, and exhaust passages for the escape of the waste products of combustion.

9. The combination in a furnace having an annular wall, an overhanging roof arched in cross section, the outer edge of the roof being supported by the wall, means for supporting the inner edge of the roof, said roof having a central opening therein, a rotating hearth mounted under the roof and having a vertical inner wall extending to a point near the roof but not touching the same so as to provide a free passage for the ingress of air to the combustion chamber, a series of air inlet passages and a series of exhaust flues, said inlet passages and exhaust flues being arranged in pairs and close together, the air inlet passages entering the combustion chamber near the roof and the exhaust flues communicating with the combustion chamber near the hearth, with a series of burners projecting into the furnace at the air flues and arranged at an angle so as to direct the flame at a tangent with respect to the inner wall of the combustion chamber, thus maintaining a rotary action of the fuel and gases.

10. The combination in a furnace, of an annular wall, an overhanging roof, a rotating hearth having a wall extending to a point near the roof, means for supplying fuel to the combustion chamber thus formed, the center of the furnace being open so that air can be drawn into the combustion chamber through the space between the wall of the hearth and the roof.

11. The combination in a furnace, of an annular wall, an overhanging roof, a rotating hearth mounted under the roof within the wall, said hearth having a vertical wall extending to a point near the roof, the said wall of the hearth and the annular wall of the furnace forming the side walls of the combustion chamber, means for supplying fuel and air to the combustion chamber near the roof, and outlet flues communicating with the combustion chamber near the hearth, and burners arranged so as to project a flame against the wall of the hearth.

12. The combination in a furnace, of an annular wall, an overhanging roof supported at its outer edge by the wall, means for supporting the inner edge of the roof, a rotating hearth mounted under the roof, an annular flue communicating with a stack, flues in the annular wall of the furnace forming communication between the combustion chamber and the annular flue, and means for supplying products of combustion to the combustion chamber.

In testimony whereof, I have signed my name to this specification, in the presence of two subscribing witnesses.

CHARLES W. THOMAS.

Witnesses:
Wm. E. Shupe,
Wm. A. Barr.